United States Patent [19]

Hardy et al.

[11] Patent Number: 4,519,373
[45] Date of Patent: May 28, 1985

[54] INTERNAL COMBUSTION ENGINE HAVING A VARIABLY ENGAGABLE SLIPPING WET CLUTCH FOR DRIVING A SUPERCHARGER

[75] Inventors: James A. Hardy, Playa del Rey; David L. Alfano, Redondo Beach, both of Calif.

[73] Assignee: The Garrett Corporation, Los Angeles, Calif.

[21] Appl. No.: 432,056

[22] Filed: Sep. 30, 1982

[51] Int. Cl.³ .............................................. F02B 39/12
[52] U.S. Cl. .................................... 123/559; 123/561; 192/70.12; 192/84 C; 192/113 B
[58] Field of Search .................. 60/607, 608; 123/559, 123/561; 192/70.12, 84 C, 113 A, 113 B

[56] References Cited

U.S. PATENT DOCUMENTS

| | | | |
|---|---|---|---|
| 1,630,634 | 5/1927 | Porsche | 123/559 |
| 1,702,116 | 2/1929 | Hoffman | 192/70.12 |
| 1,878,210 | 9/1932 | Vincent | 123/559 |
| 2,054,377 | 9/1936 | Havill et al. | 192/113 B X |
| 2,283,644 | 5/1942 | Nallinger | 123/561 |
| 2,386,096 | 10/1945 | Ehrling | 60/608 |
| 2,403,399 | 7/1946 | Reggio | 123/561 X |
| 2,660,991 | 12/1953 | Wasielewski | 123/561 |
| 2,733,798 | 2/1956 | Almen et al. | 192/70.12 |
| 2,847,102 | 8/1958 | Tiedeman et al. | 192/113 B X |
| 2,884,107 | 4/1959 | Frankel | 192/113 B X |
| 3,292,899 | 12/1966 | Egli . | |
| 3,366,210 | 1/1968 | Webster | 192/70.12 |
| 3,648,811 | 3/1972 | La Flame | 192/58 B |
| 3,727,735 | 4/1973 | La Flame | 192/58 B |
| 3,782,850 | 1/1974 | Egli et al. | 415/53 T |
| 3,869,866 | 3/1975 | Timoney | 60/607 |
| 3,921,772 | 11/1975 | Hayashi et al. | 192/58 B |
| 3,949,849 | 4/1976 | Hammer | 192/58 B |
| 3,990,556 | 11/1976 | Hayashi et al. | 192/58 B |
| 4,022,298 | 5/1977 | Malinowsky | 192/113 B X |
| 4,027,758 | 6/1977 | Gustavsson et al. | 192/113 B |
| 4,113,067 | 9/1978 | Coons et al. | 192/113 B X |
| 4,280,609 | 6/1981 | Cruise | 192/113 B |

Primary Examiner—Michael Koczo
Attorney, Agent, or Firm—J. Henry Muetterties; Joseph A. Yanny; Albert J. Miller

[57] ABSTRACT

A supercharger includes a compressor system which is driven through an electro-magnetically actuated variable slipping wet clutch to supply boost to an engine in the form of compressed air according to load requirements. Apparatus and methods are disclosed for supplying boost to the engine by varying the drive torque via the clutch system to the compressor system.

3 Claims, 3 Drawing Figures

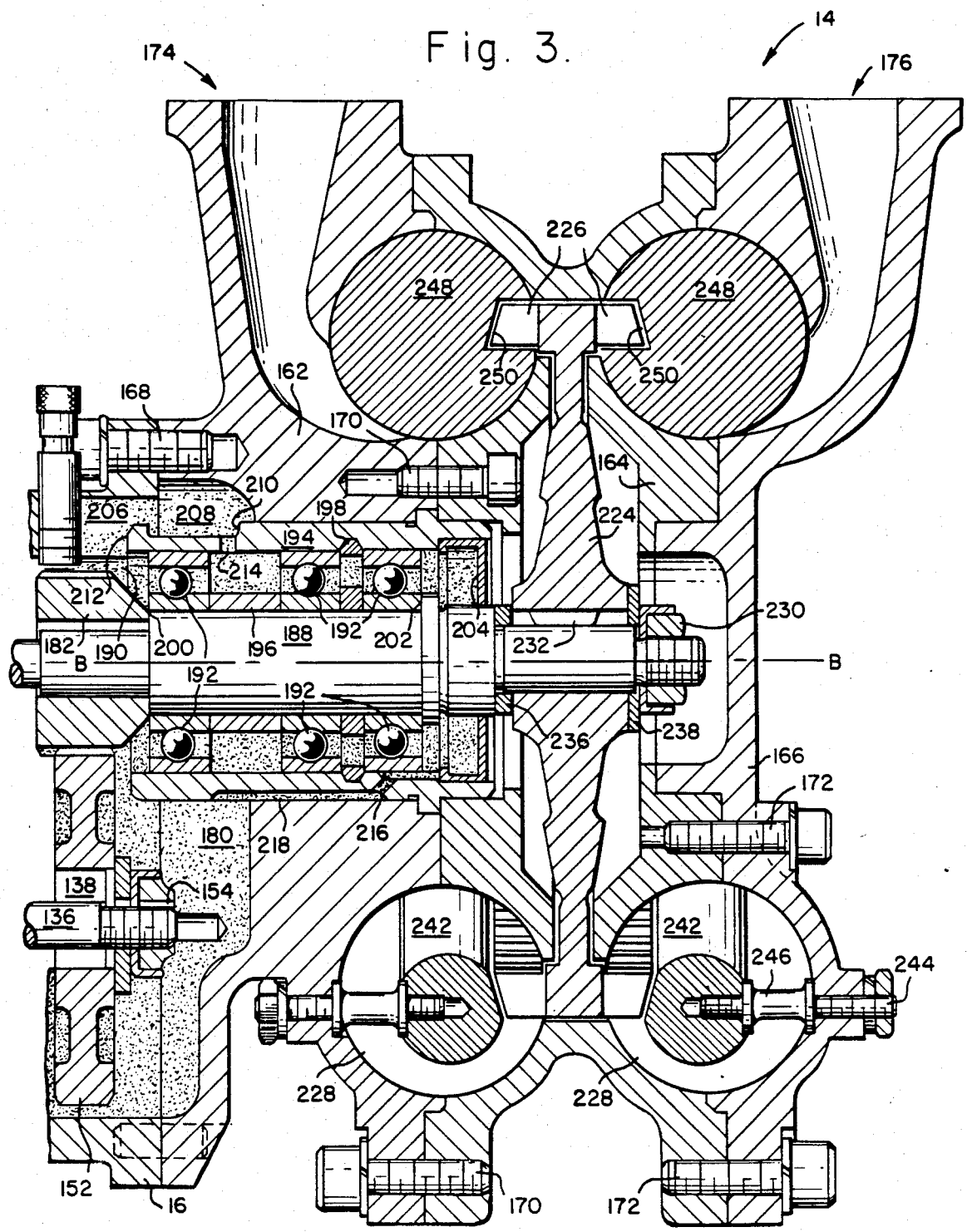

INTERNAL COMBUSTION ENGINE HAVING A VARIABLY ENGAGABLE SLIPPING WET CLUTCH FOR DRIVING A SUPERCHARGER

BACKGROUND OF THE INVENTION

This invention relates to supercharger constructions. More specifically, this invention relates to a supercharger wherein a compressor system is driven through an electromagnetically actuated variable slippiing wet clutch to supply boost to an engine according to load requirements. The slipping wet clutch is cooled and lubricated via an isolated or self-contained lubricant flow system.

It is desirable to be able to supply boost energy to an internal combustion engine in the form of compressed air during certain vehicle use conditions such as acceleration from a standing stop. It is also desirable, however, to minimize the parasitic losses which the engine suffers in order to drive boost energy supply systems. In this vein, it is also desirable to be able to completely decouple such systems when engine load conditions will permit effective operation without boost energy augmentation.

A variety of boost energy supply systems have been developed and employed in the past. Each such system is endowed with inherent advantages and shortcomings. As a result, extreme care must be taken to properly match a given engine (having its own capability and requirements) with a boost energy supply system to achieve the desired objective.

Of the boost energy supply systems thus far developed, the following discussed are considered the most noteworthy and exemplary of the alternative approaches.

Positive displacement, constantly engine driven mechanical air pumps, have long been used in conjunction with internal combustion engines to augment or boost the pressure of air supplied to the engines. These systems are typified by the roots blower systems available today in the marketplace. While these systems have many positive advantages, they are nonetheless plagued with certain downside factors, which make them impractical or impossible to use in certain applications, and indeed unacceptable in certain market segments. However, in small passenger car applications, with their ever decreasing engine sizes, the constant parasitic power losses associated with continuously driven mechanical systems, make them intolerable alternatives. Additionally, the excessive noise associated with roots type systems, make them generally unacceptable to the consumer as passenger car power train accessories. On the upside, however, positive displacement pumps require lower specific speeds than centrifugal pumps to supply sufficient mass flow and pressures to a typical reciprocating I-C engine. As such, the speed requirements of positive displacement pumps are more matched to the engine operating speed ranges available, and thus accomplish more efficient and effective boost supplies, than many centrifugal equivalents.

Another approach to mechanically supercharging small passenger car sized, I-C engines, has involved a dynamic system, in which a compressor wheel or its centrifugal equivalent, is constantly driven by the engine to supply the required boost. However, the constant parasitic loss associated with this approach is intolerable for the aforementioned reasons set forth with respect to the roots type systems. Additionally, the high specific speed required for optimum operation of centrifugal compressors, makes them a bad match for direct drive from the engine through clutches and gears.

In one variation of the typical mechanically driven dynamic supercharger system, a control system is provided which allows discrete coupling or de-coupling of the compressor to the engine drive system. However, this variation does not contemplate varying or modulating the speed of the compressor during the driven mode, except as a direct function of engine speed, therefor making it insufficiently versatile to truly match boost augmentation to engine needs in an economical fashion. The mechanically driven supercharger systems described (both positive displacement and centrifugal) do, however, provide nearly instant boost or throttle response to the engine, which is desirable.

Typical turbocharging, which involves exhaust driving of coaxially joined turbine and compressor wheels, to supply boost to an engine, finds ideal application in high exhaust mass flow engine settings. However, even in this setting, the back pressure to the engine, which is naturally associated with inserting a turbine downstream of the engine in the exhaust flow path, presents parasitic losses which can be undesirable. ”Turbo-lag”, or hesitation, which is involved with turbocharger systems, can also prove undesirable. Todays smaller displacement engines compound the problems of turbocharging to a degree, since they generate substantially less driving exhaust mass flow than their predecessors of yesteryear. As a result of this fact, the development of smaller and smaller turbochargers has been pursued to more properly match the available exhaust mass flow. Still, the turbolag problem has not been eliminated and the back pressure to the engine is still present. On the upside however, turbocharging with the use of exhaust gas bypass systems of the type described in U.S. Pat. No. 4,120,156, issued Oct. 17, 1978, to Charles E. McInerney, allows modulation of the compressor speed and thus the boost to the engine according to load demand and not solely as a function of engine speed and in this vein presents advantages not available to conventional mechanical supercharger users.

The present invention thus marries many of the advantages of turbocharging with those of mechanically supercharging into a single system which minimizes the downside effects of both on the drive system. The method of the present invention thus utilizes the system of the present invention to selectively provide boost to an engine.

SUMMARY OF THE INVENTION

Accordingly, the present invention provides a supercharger system and method which utilizes a variably slipping wet clutch to couple a compressor system such as the type described in U.S. Pat. No. 3,292,899, issued Dec. 20, 1966, to Hans Egli, or U.S. Pat. No. 3,782,850, issued Jan. 1, 1974 to Hans Egli, Fredrick E. Burdette and James H. Nancarrow, with an engine to drive the compressor and supply boost energy to the engine in the form of compressed air as a function of the load on the engine, by modulating the degree of slip in the clutch mechanism. The degree of modulation may vary from total disengagement with inherent lack of compressor movement, to complete nearly non-slip driving, dependent upon engine load. Response of the compressor to clutch mechanism engagement is nearly instantaneous. During disengagement of the clutch mechanism, parasitic losses to the engine are de minimis. The specific speed range required by the compressor system of the present invention is well matched with the engine output speed range to allow for efficient and effective boost to the engine.

An electro magnetically actuated solenoid may be used to receive a signal indicative of engine load, and thereupon to modulate the position of a clutch actuator plate which controls the degree of slip in the clutch mechanism and thus the compressor output.

A closed, isolated or self-contained lubricant system, dedicated to lubricating and cooling the clutch mechanism, may be included to side-step the dirt and corrosive problems associated with the use of engine oil upon slipping wet clutch frictional surfaces. Flow path defining fins can be provided near the periphery of the clutch housing to cooperate with a fan driven by the engine and thus dissipate heat buildup in the clutch and associated lubricant.

Thus, the present invention addresses the problems and shortcomings of the prior art to provide a boost augmentation system of the supercharger type for use with internal combustion engines which is particularly atuned to the needs of today's smaller engines by providing near instantaneous response to engine needs and the desirable features of compressor speed modulation as a function of engine load, yet minimizing parasitic engine power drain.

Other objects and advantages of the present invention are set forth in or will become apparent from the following detailed description of a preferred embodiment of the invention when read in conjunction with the accompanying drawings.

BRIEF DESCRIPTION OF THE DRAWINGS

FIG. 3 is a sectional view of a compressor system according to the present invention.

DESCRIPTION OF THE PREFERRED EMBODIMENT

Figure 1:
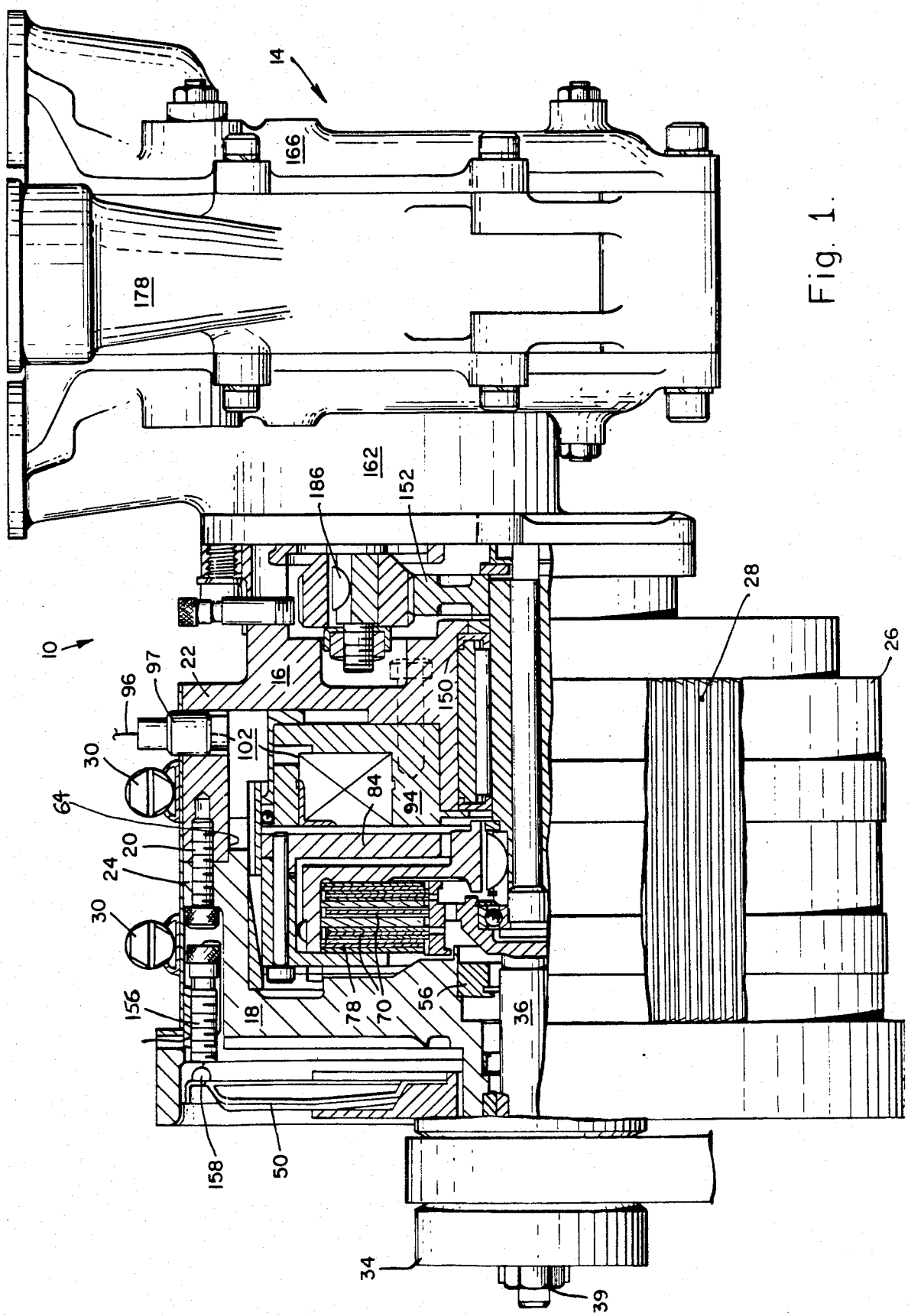
FIG. 1 is a partially fragmented and sectioned elevational view of a supercharger construction according to the present invention.

Referring now to the drawings, a supercharger 10 according to the present invention is shown to include a slipping wet clutch 12 and a compressor section 14. The wet clutch 12 includes matable clutch support housing halves 16 and 18 which are compatibly matable and retainable, as by bolt 20 of any suitable kind so as to be retained in supporting relationship with respect to the remainder of the clutch assembly as more fully described herein below.

The housing halves 16 and 18 are respectively provided with projecting lands 22 and 24 respectively, which are spaced around the periphery of the housing halves at approximately 90° intervals. These landed portions 22, 24 serve to coact with bolt 20 in a fashion shown to join the halves and also provide a supporting surface for shroud 26. Distributed about the outer surface of the housing halves 16 and 18 and inside the shroud are axially arranged heat exchange fin surfaces 28 which are in heat exchange relationship with the clutch assembly 12 to permit fluid flow along the fins 28 and dissipate heat buildup in the wet clutch 12. The fins 28 are arranged between consecutively mated pairs of landed portions 22 and 24. The shroud 26 is retained about the periphery of the combined and mated housing halves 16 and 18 by clamps of the type shown at 30 or other suitable means.

Figure 2:
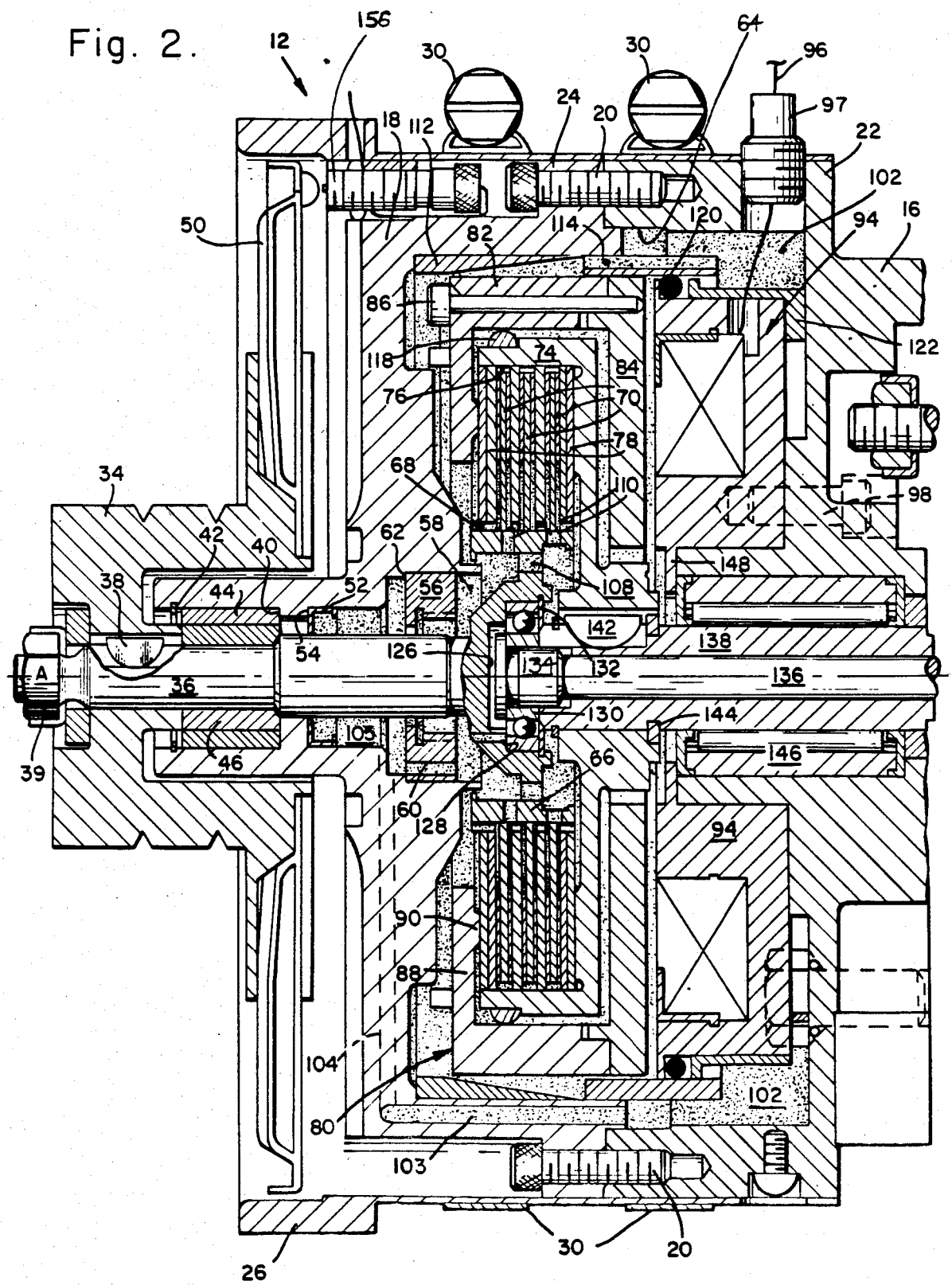
FIG. 2 is a cross-sectional view of a supercharger slipping wet clutch arrangement according to the present invention.

The compressor receives torque via slipping wet clutch 12, to compress the air and supply the same to the engine. The slipping wet clutch is coupled to the engine crankshaft in torque receiving relationship thereto by a belt to drive hub 34 which is secured (as shown in FIG. 2) to input shaft 36 by a Woodruff key 38 and locking nut arrangement 39 of any conventional sort to be rotatably driven about axis A—A. A suitable bore is placed through clutch support housing halve 18 to permit passage of shaft 36 therethrough. A suitable snap ring 42 arrangement and shoulder 40 are provided to cooperate bearing 46 and sleeve 44 bore and suitably journaled in place near the end of shaft 36 and thereabout to permit rotation of shaft 36 about axis A—A. A suitable fan 50 is secured as by pins (not shown) to hub 34 to be rotatable about axis A—A to drive cooling air across fins 28 thereby removing heat from the clutch mechanism 12 and preventing destructive heat buildup therein.

An oil seal 52 is concentrically distributed about the shaft 36 to be snugly cooperative therewith and with shoulder 54, to the inboard side of the bearing 46 to prevent leakage of oil or an equivalent lubricant, along the shaft 36 towards hub 34. Concentrically arranged about shaft 36 and slightly to the inboard side of seal 54 is oil guide (or flow control) 56 arranged to be freely movable within cavity 58 to guide oil flow through axially arranged apertures 60 along shaft 36, and away from seal 54. Clutch support housing halve 18 includes shoulder 62 which interacts with the outboard face of oil guide 56 to prevent outboard axial migration of oil guide 56 from cavity 58.

Clutch support housing halves 18 and 16 are provided with cooperative inner surfaces which define cavity 64 in which the central operating elements of the slipping wet clutch arrangement are located. Shaft 36 terminates in a flared and hollowed end 66, having axially aligned splines 68 on the outer surface thereof. The splines are compatible with receptacles or teeth of friction plates 70 to allow for securement of the fiber coated friction plates 70 symmetrically about axis A—A for rotation with shaft 36 thereabout.

Also rotatable about axis A—A in cavity 64 is clutch hub 74 which includes on its circumferential inner surface splines 76, or other equivalent means arranged similarly to those upon input shaft flared end 66 to be compatible with clutch spacer plates 78 which sequentially flank friction plates 70 along axis A—A to be frictionally engagable with friction plates 70. Thus, when input shaft 36 and friction plates 70 are being rotated and sufficient engagement with spacer plates 78 occurs, clutch hub 74 is also rotated about axis A—A.

The degree of engagement between spacer and friction plates 78 and 70 is determined by the position of clutch actuator plate 80 which has compatible halves 82 and 84 which are secured as by bolts 86 into a single unit partially enclosing the clutch hub 74. Depending radially inwardly from the base of clutch actuator plate half 82 are depending fingers 88 having axially inboardly facing extended lands 90 for engaging the outboard most face of clutch spacer plates 78. Clutch actuator plate 80 is free to move axially within cavity 86 thereby varying the degree of contact between lands 90 and the outboard spacer plate 78, and thus the force exerted, to vary the degree of slip and thus interengagement between clutch spacer plates 78 and friction plates 70, to permit an infinite variety of relative speeds between shaft 36 and clutch hub 74. These relative speeds may vary from a situation where input shaft 36 is rotating and clutch hub 74 is still, as when there is no engagement between the clutch spacer plates and friction plates to the opposite situation where shaft 36 and hub 74 are rotating at identical speeds as when the degree of slip between the clutch spacer plates and friction plates is nonexistent due to the amount of force application by clutch actuator plate 80.

Clutch actuator plate half 84 is a metal which is responsive to electromagnetic fields so as to be movable axially along axis A—A and thus vary the degree of slip between friction plates 70 and clutch spacer plates 78. The electromagnetic field is generated by an electromagnet 94 which receives a variable current through line 96, which is indicative of the load which is placed upon the engine, to vary the electromagnetic field and alter the position of clutch actuating plate 80 accordingly. Thus, when high loads are placed upon the engine which would require boost augmentation, the current through line 96 to electromagnet 94 is increased to cause a greater degree of interaction between friction plates 70 and the spacer plates 78 and thus rotate clutch hub 74 at a higher rate. The opposite is obviously true as well. The electromagnet 94 is maintained in clutch support housing half 16 as by bolts of the type illustrated at 98. Line 96 passes through leakproof threaded plug 97 which is threadably secured in housing half 16.

Also part of the present invention is a lubricant distribution system for circulating a suitable lubricant about the clutch means to allow for cooling and lubrication thereof and further enhance the ability of the clutch spacer plates and friction plates to vary the amount of engine torque which is transmitted from shaft 36 to clutch hub 74. The lubricant distribution system is a closed system dedicated solely to distributing oil about the clutch and does not depend upon a supply of engine oil with inherent impurities such as dirt and corrosives which can be problematic in clutch arrangements.

Specifically included in the lubricant distribution system is flow control 56 which controls the flow of oil from reservoir 102 through passage 103 to hidden passage 104 and to cavity 105. The pumping of the oil is caused by the pressure differential created by centrifugal forces in cavity 64 due to the rotation of the clutch parts within this cavity. Even though the cavity 64 is filled largely by oil vapors and air, the pressure differential is sufficient to cause the desired pumping action. From cavity 105 the oil proceeds along shaft 36 and through aperture 60 and to cavity 58 and is directed outwardly along input shaft flared and hollow end 66 so that lubricant may pass through passageways 108 and 110 and interact with friction plates 70 and clutch spacer plates 78. The lubricant is distributed for interaction with friction and spacer plates 70 and 78 by being forced along spline 68.

When the position of actuator plate 80 calls for relatively non-slip simultaneous rotation of shaft 36 and clutch hub 74 the friction plates 70 and spacer plates 78 are in such close proximity to each other that the oil cannot be forced between them and migrates axially along splines 68 and is forced eventually radially outwards toward ramped spacer plate 112 near the outer periphery of cavity 64. The lubricant eventually enters passageway 114 for reentry into reservoir 102 for redistribution in the manner discussed.

When, however, the position of clutch actuator plate 80 demands less rotation of clutch hub 74 the pressure of the oil passing through passages 110 forces the individual friction and spacer plates 70 and 78 respectively away from each other causing thereby more slippage between the two and thus a variance in the rotational speed between shaft 36 and clutch hub 74. The presence of the oil or lubricant traveling between the frictional surfaces of said plates thus further enhances their ability to travel and rotate about axis A—A at different relative speeds. Eventually the oil which passes between the plates is forced along spline 76 of clutch hub 74 and enters cavity 64 for passage along ramped spacer 112 and eventual entry into reservoir 102 for redistribution.

The lubricant will obviously absorb heat as it travels through the interworkings of the clutch mechanism and as it is directed back to reservoir 102. The heat is transferred to housing halves 18 and 16 so that the interaction of fan 50 within fins 28 may dissipate the heat and prevent destructive heat buildup in the clutch mechanism. A brass ring 118 which acts as a bearing surface for clutch hub 74 is also provided, and tends to slow migration of oil axially inwardly on the outer circumferential surface of the clutch hub 74. Seal 120 and seal retainer 122 were also provided to slow migration of the lubricant from a path other than as described immediately above.

As previously described the inboard end of shaft 36 includes a hollowed and flared end 66. The hollowed portion is concentrically located with respct to axis A—A to form cup like cavity 126 having projecting shoulders 128. Received within cupped cavity 126 is a suitable ball bearing 130 which is retained in cavity 126 by interaction with shoulder 128, snap ring 132 (which is inserted into flared ends 66), and the flanged end 134 of extended bolt 136 to permit rotation of shaft 138 about axis A—A at a variety of relative speeds compared to shaft 36.

Shaft 138 forms the element through which torque is transmitted to the compressor 14 as more fully described hereinbelow. Shaft 138 is interconnected to clutch hub 74 by Woodruff key 142 (secured as shown in FIG. 2 by snap rings 144) to require simultaneous rotation of clutch hub 74 and shaft 138. Suitable bearings 146 are nested in clutch support housing half 16 to cooperate with shaft 138 to journal the same therein for rotation about axis A—A in response to rotation of clutch hub 74. Bearings 146 are retained within the clutch support housing half 16 by suitable bearing retention shoulder 148 which projects from electromagnet 94 as shown in FIG. 2.

As best seen in FIG. 1, a seal 150 is placed near the end of shaft 138 and retained in clutch support housing half 16 as shown to encompass shaft 38 and permit rotation thereof while preventing entry of foreign matters into the bearing area. A gear 152 is secured to the end of shaft 138 on the opposite side of seal 150 from bearing 146 by the combination of a locking nut arrangement 154 of any conventional means with the threaded end of extended bolt 136 and a Woodruff key (not shown) to require rotation of gear 152 with shaft 138.

Additional items as shown in FIGS. 1 and 2 are supplied in clutch support housings such as input speed sensor 156 which is a monopole with retainer means to cooperate with magnetic tit 158 so that input speed to the clutch 12 may be ascertained. This arrangement, of course, is not required.

Turning now to the compressor assembly 14, FIGS. 1 and 3, it is ascertainable that the compressor actually includes three separate housings, i.e. bearing housing 162, discharge housing 164, and cover housing 166. Bearing housing 162 may be joined to clutch support housing 16 as by bolts 168. Similarly, discharge housing 164 may be joined to bearing housing 162 and cover housing 166 to discharge housing 164 as by bolts 170 and 172 respectively. Each of the housings is appropriately evacuated to provide cavities therein to serve functions as will be more fully described hereinbelow. Bearing housing 162 and end housing 166 are appropriately provided with intakes 174 and 176 respectively, through which ambient air is drawn, during operation of the compressor. The air is supercompressed and discharged through port 178 (FIG. 1) in discharge housing 164.

Locking nut arrangement 154, shaft 138 and gear 152 terminate in and are partially housed by cavity 180 defined by the walls of bearing housing 162 and clutch support housing half 16, to be freely rotatable therein. Gear 152 interacts with another gear 182 which is suitably secured as by locking nut arrangement 184 and Woodruff key 186 in a conventional manner, to compressor shaft 188 which rotates above axis B—B as more fully described hereinbelow. Gear 182 is located in cavity 190.

Bearings 192 are secured within sleeve 194 and in contact with shaft 188 to permit rotation thereof as by bearing spacer 196 and locking spacer 198, in conjunction with shoulders 200, (of gear 182), and 202 (of shaft 188). Concentrically and snugly fit around shaft 138 and to the opposite end of shaft 188 from gear 182, is located oil seal 204 which snugly fits in the surface of bearing sleeve 194. Thus lubricating oil which is distributed around the bearings and the gears as more fully described hereinbelow cannot exit the bearing housing 162.

The compressor 14 of the present invention is also lubricated by a closed lubricant system in which cavity 180 is at least always partially filled with a suitable lubricant. Rotation of shaft 138 and the corresponding rotation of gear 152 causes the oil to be slung upwardly towards gear 182 and similarly slung even further upwardly into cavity 206. The lubricant ultimately ends up in cavity 208 of bearing housing 162 which serves at least temporarily as a reservoir. Bearing race 194 is conveniently provided with a recess 210 which has oil retaining lip 212. A passage 214 allows for passage of the lubricant down through the race into the bearing area for distribution throughout to lubricant and cool the same. The oil exits the bearing area through passageway 216 for reentry through slot 218 into cavity 180.

Secured to the end of shaft 188 in the cavity of discharge housing 164 is a disc 224 having on its radially outward edge, axially and oppositely arranged cascades of blades 226. The walls of the housings 162, 164 and 166 cooperate to form a pair of torroidal volumes 228 which communicate with intakes 174 and 176. The disc 224 is secured to shaft 188 as by locking nut arrangement 230 and Woodruff key 232 in a conventional manner. Shim 236 and wheel washer 238 are provided to prevent axial movement of disc 224 on shaft 188 and aid in properly securing the same in the compressor section 14.

Stator rings 242 are suspended in toroidal volumes 228 and spaced from the walls thereof as by screw and nut arrangements 244 and stud 246. The stator ring 242 includes a block seal 248 which includes slots 250 through which blades 226 pass. Thus shown, each blade 226 of the cascade has a radially inner edge elongated axially with respect to the radially located outer edge to form an angularly set blade tip. The stator rings 242 include an angularly set face extending circumferentially about the blade and disposed for close tolerance running with the angularly set blade tips of blades 226. Thus, the face of the stator ring 242 is suitably formed by machining to closely correspond to the angularly set plane through which the blade tips rotate and takes the form of slot 250 which continues uninterrupted through the block seal 248.

In operation then, the compressor 14 of the present invention operates as a torroidal vortex energy transfer machine of the type described in U.S. Pat. No. 3,292,899 issued Dec. 20, 1966 to Hans Egli, or No. 3,782,850 issued Jan. 1, 1974 to Hans Egli, Frederick E. Burdette and James H. Nancarrow, and incorporated herein by reference, to draw a fluid such as air into the compressor housings through the inlets 174. The disc 224 when rotated accelerates the fluid through the toroidal paths 228 to port 178 for delivery to an engine. The use of the dual cascade of blades, allows enhanced performance of the compressor.

Some of the desireable features of the toroidal vortex energy transfer machine (TVM) of the present invention are set forth hereinbelow. One characteristic of the TVM is that fluid flow therethrough travels circumferentially about the volume, and the flow rotates at the same time about the centroid of the volume, so that the fluid enters into momemtum exchange relationship with the blades 226 many times before existing through port 178. This feature allows for better compression of the air at low specific compressor speeds than can be accomplished with centrifugal impellers. Therefor, the TVM is well matched to output engine speed range since it needs only to run in the RPM neighborhood of 25,000 RPM to achieve optimum operational characteristics. On the other hand, typical centrifugal compressor requires RPM speeds of about 100,000 to 120,000 RPM for effective ouput to occur. Since the TVM, in operation, imparts the air particles a multitude of times before existing through port 178, (the number of inputs is of course dependent on a number of variables) it operates essentially like multi-stage compressor system, but requires little space in comparison.

In operation then the supercharger of the present invention receives torque via a belt. The engine torque drives shaft 36 in clutch assembly 12 to transfer torque to friction plates 70 which are operatively associated with shaft 36 to be rotatable. A signal which is indicative of engine load, and therefore need for boost augmentation, is transmitted via line 96 to electromagnet 94, and causes an appropriate movement of clutch actuator hub 80. The degree of interaction between the clutch actuator hub and the outboard most clutch spacer plate 78 causes frictional interengagement between the clutch spacer plates and the friction plates 70 to thereby cause an appropriate amount of rotation in clutch hub 74. The torque transferred to clutch hub 74 is transmitted via shaft 138 to gear 152 to correspondingly drive gear 182 of the compressor.

Shaft 188 correspondingly rotates with gear 182 to drive disc 224 and blades 226 through torroidal volumes 228. As the rotation of blades 226 occurs, air is drawn in through inlets 174 and 176 compressed and discharged through port 178 for intake by the engine in the form of boost energy.

The action of the centrifugal force generated by rotation of the clutch mechanism draws oil through a circulatory system as previously described to lubricate the workings of the clutch assembly 12 and dissipate heat buildup therein for transfer to housing halves 16 and 18. Rotation of hub 34 also causes rotation of fan 50 which drives air along fins 28 which are in heat exchange relation with clutch housing halves 18 and 16 to cool the clutch housing halves thereby dissipating the heat which is in the clutch assembly 12. When there is such a diminished load placed upon the engine that boost augmentation is not required clutch actuator plate 80 is permitted to move so as not to force interengagement between clutch friction plates 70 and spacer plates 78 and the pressure of oil which is being distributed through passages 110 along the tapered radially inward surfaces of friction plates 70 causes separation of friction plate 70 and spacer plates 78. Thus, by varying the current to electromagnet 94 varying degrees of slip between clutch plates 78 and friction plates 70 may be obtained and thus an infinite variety of relative speeds between input shaft 36 and output shaft 138 so that the boost augmentation to the engine in the form of compressed air from compressor 14 may thus be varied as a function of engine load. Rotation of compressor shaft 188 via rotation of shaft 138 causes distribution of oil throughout the compressor gears and bearings to lubricate the same.

A variety of other modifications and improvements of the supercharger construction of the present invention are believed to be possible without varying from the scope of this invention.

Accordingly, it is intended that the detailed description herein set forth is not intended to be limiting with respect to the present invention except by way of the appended claims wherein what we desire to claim and secure by United States Letters Patent is:

1. A supercharger of the type which converts engine torque into boost energy for delivery to the engine in the form of compressed air comprising:

compressor means communicated with a source of air to the engine and rotatably drivable for compressing the air and directing the same towards the engine;

a variably engagable slipping wet clutch means communicated with the engine in torque receiving relationship thereto and with the compressor means to be capable of transmitting said torque to the compressor means and drive the same;

modulating means for variably controlling the amount of engine torque transmitted through said clutch means and to said compressor means to control the speed of the compressor;

lubricant distribution means for passing a lubricant about said clutch means to cool and lubricate the latter and to further enhance the ability of said clutch means to vary the amount of torque transmitted to said compressor means;

fan means for cooling said clutch means, said fan means in torque receiving relationship to said engine; and means, mounted to said fan means for relaying an engine parameter to said modulating means.

2. The supercharger according to claim 1 further including fin means in heat exchange relationship with said clutch means for dissipating heat.

3. The supercharger according to claim 1 wherein said means for relaying an engine parameter to said modulating means includes an input speed sensor and a magnetic tit mounted to said fan means for measuring engine speed.

* * * * *